United States Patent
Li et al.

(10) Patent No.: US 10,033,824 B2
(45) Date of Patent: Jul. 24, 2018

(54) CACHE MANIFEST FOR EFFICIENT PEER ASSISTED STREAMING

(71) Applicant: Samsung Electronics Co., Ltd., Suwon-si, Gyeonggi-do (KR)

(72) Inventors: Zhu Li, Plano, TX (US); Imed Bouazizi, Plano, TX (US); Kyungmo Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 471 days.

(21) Appl. No.: 14/546,933

(22) Filed: Nov. 18, 2014

(65) Prior Publication Data

US 2015/0381755 A1 Dec. 31, 2015

Related U.S. Application Data

(60) Provisional application No. 62/019,089, filed on Jun. 30, 2014.

(51) Int. Cl.
*H04L 29/08* (2006.01)
*H04L 29/06* (2006.01)

(52) U.S. Cl.
CPC .......... *H04L 67/2842* (2013.01); *H04L 65/80* (2013.01); *H04L 67/16* (2013.01);
(Continued)

(58) Field of Classification Search
CPC . H04L 65/4069; H04L 65/4084; H04L 65/80; H04L 67/28; H04L 67/2814;
(Continued)

(56) References Cited

U.S. PATENT DOCUMENTS

| 9,788,078 B2 * | 10/2017 | Li | H04N 21/234381 |
| 2003/0204602 A1 * | 10/2003 | Hudson | H04L 67/2842 |
| | | | 709/228 |

(Continued)

FOREIGN PATENT DOCUMENTS

| WO | WO 2013-098317 A1 | 7/2013 |
| WO | WO 2013-098319 A1 | 7/2013 |

OTHER PUBLICATIONS

Famaey et al., "On the impact of redirection on HTTP adaptive streaming services in federated CDNs." IFIP International Conference on Autonomous Infrastructure, Management and Security, Jun. 2013, pp. 13-24.*

(Continued)

*Primary Examiner* — Vivek Srivastava
*Assistant Examiner* — William C McBeth

(57) ABSTRACT

A method for delivering content in a communication network includes receiving, by a cache, a request message requesting content to be served. The method includes storing multiple cache manifests corresponding to indicating content and capabilities of a plurality of caches. Each cache manifest indicates content and capabilities of a respective one of the caches and lists descriptions of the content stored in the respective cache. The method includes determining, based on information in the plurality of cache manifests, to serve the requested content, by selecting a cache from which to serve the requested content. The method includes in response to the determination, instructing the selected cache to transmit the requested content to a client device that generated the request message; and alternatively determining to not serve the requested content, based on the information in the plurality of cache manifests, and forwarding the request message to a higher level device.

14 Claims, 6 Drawing Sheets

(52) U.S. Cl.
CPC ........ *H04L 67/288* (2013.01); *H04L 67/2814* (2013.01); *H04L 67/2838* (2013.01)

(58) Field of Classification Search
CPC ............. H04L 67/2819; H04L 67/2838; H04L 67/2842; H04L 67/288; H04L 67/2885; H04N 21/20; H04N 21/21; H04N 21/218; H04N 21/2181; H04N 21/222; H04N 21/2225; H04N 21/231; H04N 21/23103; H04N 21/23106; H04N 21/23109; H04N 21/23116

See application file for complete search history.

(56) References Cited

U.S. PATENT DOCUMENTS

| | | | | |
|---|---|---|---|---|
| 2010/0268789 | A1* | 10/2010 | Yoo | H04L 67/2842 709/214 |
| 2011/0126248 | A1* | 5/2011 | Fisher | H04N 21/2365 725/95 |
| 2011/0314174 | A1* | 12/2011 | Joung | H04N 21/23439 709/231 |
| 2012/0158884 | A1* | 6/2012 | Hatano | H04N 21/23106 709/213 |
| 2012/0194534 | A1* | 8/2012 | Benno | H04N 21/2183 345/557 |
| 2012/0209952 | A1* | 8/2012 | Lotfallah | H04L 65/4084 709/217 |
| 2012/0284371 | A1* | 11/2012 | Begen | H04L 65/1069 709/219 |
| 2012/0290644 | A1* | 11/2012 | Gabin | H04L 65/4084 709/203 |
| 2013/0013747 | A1* | 1/2013 | Cranor | H04L 67/1034 709/219 |
| 2013/0054756 | A1* | 2/2013 | Do | H04N 21/23103 709/219 |
| 2013/0097309 | A1* | 4/2013 | Ma | H04L 67/2842 709/224 |
| 2013/0144979 | A1* | 6/2013 | Kansal | H04N 21/23106 709/219 |
| 2013/0219005 | A1* | 8/2013 | Kotecha | H04W 4/18 709/212 |
| 2013/0275618 | A1* | 10/2013 | Puttaswamy Naga | H04L 67/2842 709/236 |
| 2014/0019633 | A1* | 1/2014 | Zhang | H04L 65/601 709/231 |
| 2014/0089465 | A1* | 3/2014 | van Brandenburg | H04L 65/605 709/217 |
| 2014/0115724 | A1 | 4/2014 | van Brandenburg et al. | |
| 2014/0146669 | A1 | 5/2014 | Ozawa | |
| 2014/0149210 | A1 | 5/2014 | Ma et al. | |
| 2014/0258366 | A1* | 9/2014 | L'Heureux | H04L 29/08 709/203 |
| 2014/0331266 | A1* | 11/2014 | Harrison | H04N 21/23106 725/98 |
| 2015/0180924 | A1* | 6/2015 | O'Callaghan | H04L 65/605 709/219 |
| 2015/0207846 | A1* | 7/2015 | Famaey | H04L 67/02 709/219 |
| 2015/0220636 | A1* | 8/2015 | Deen | H04N 21/222 707/740 |
| 2015/0222725 | A1* | 8/2015 | Xu | H04L 67/06 709/213 |
| 2015/0358373 | A1* | 12/2015 | Famaey | H04N 21/26258 709/231 |
| 2016/0006830 | A1* | 1/2016 | Houdaille | H04L 67/2842 709/213 |
| 2016/0050246 | A1* | 2/2016 | Liao | H04L 5/0085 709/219 |
| 2016/0219091 | A1* | 7/2016 | Gabin | H04L 65/605 |
| 2016/0248884 | A1* | 8/2016 | Larabi | H04L 67/2814 |
| 2016/0330289 | A1* | 11/2016 | Gouache | H04N 21/23106 |
| 2016/0330500 | A1* | 11/2016 | Houdaille | H04L 65/4084 |

OTHER PUBLICATIONS

Xie et al., "DASH sub-representation with temporal QoE driven layering," 2016 IEEE International Conference on Multimedia & Expo Workshops (ICMEW), Seattle, WA, Jul. 11-15, 2-16, pp. 1-6.*
International Search Report, dated Sep. 30, 2015, in connection with PCT/KR2015/006639, 3 pages.
Written Opinion of the International Searching Authority, dated Sep. 30, 2015, in connection with PCT/KR2015/006639, 6 pages.

* cited by examiner

CACHE MANIFEST FOR EFFICIENT PEER ASSISTED STREAMING

CROSS-REFERENCE TO RELATED APPLICATION(S) AND CLAIM OF PRIORITY

The present application claims priority to U.S. Provisional Patent Application Ser. No. 62/019,089, filed Jun. 30, 2014, entitled "CACHE MANIFEST FOR EFFICIENT PEER ASSISTED STREAMING." The content of the above-identified patent document is incorporated herein by reference.

TECHNICAL FIELD

The present application relates generally to video content delivery systems and, more specifically, to a cache manifest for efficient peer assisted streaming.

BACKGROUND

Users desire to receive high definition (HD) or ultra-high definition (UHD) video content over the Internet. The current state of the Internet supports streaming of HD or UHD quality video, but many problems are caused by limited end-to-end bandwidth, uncertainty in throughput, and uncertainty in delays. Internet networks accelerate delivery of the video content by including caches at various places in networks and utilizing the bandwidth of cache hosts. Early systems like Coolstream have been deployed to carry live broadcasting of popular programs (for example, the World Cup soccer games and the Chinese new year gala) to a large number of users by localizing the traffic when possible and exploring overlay paths that are not congested.

SUMMARY

In a first embodiment, a method for delivering content in a communication network includes receiving, by a cache, a request message requesting content to be served. The method includes storing a plurality of cache manifests corresponding to indicating content and capabilities of a plurality of caches. Each of the cache manifests indicate content and capabilities of a respective one of the caches and lists descriptions of the content stored in the respective cache. The method includes determining, based on information in the plurality of cache manifests, to serve the requested content, wherein the determining to serve comprises selecting from the plurality of caches a cache from which to serve the requested content. The method also includes in response to the determination, instructing the selected cache to transmit the requested content to a client device that generated the request message. The method includes alternatively determining to not serve the requested content, based on the information in the plurality of cache manifests, and forwarding the request message to a higher level device.

In a second embodiment, an apparatus for use in a communication network is provided. The apparatus includes processing circuitry configured to: receive a request message requesting content to be served, and store a plurality of cache manifests corresponding to indicating content and capabilities of a plurality of caches. Each of the cache manifests indicate content and capabilities of a respective one of the caches and lists descriptions of the content stored in the respective cache. The processing circuitry is also configured to determine, based on information in plurality of cache manifests, to serve the requested content, wherein the determining to serve comprises selecting from the plurality of caches a cache from which to serve the requested content. The processing circuitry is also configured to, in response to the determination, instruct the selected cache to transmit the requested content to a client device that generated the request message. The processing circuitry is configured to alternatively determine to not serve the requested content, based on the information in the plurality of cache manifests, and forward the request message to a higher level device.

In a third embodiment, a client device for use in a communication network is provided. The client device includes a playback buffer configured to store content. The client device includes processing circuitry configured to generate a cache manifest indicating the content and capabilities of the playback buffer and listing descriptions of the content stored in the playback buffer. The descriptions include a list of asset identifiers, each asset identifier (ID) identifying an asset of which at least one segment is stored in the playback buffer. The request message includes an asset identifier (ID). The processing circuitry is configured to initiate transmission of an update message to a content discovery service server (CDSS) in the communication network. The update message provides the cache manifest to the CDSS.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication device.

The following documents and standards descriptions are hereby incorporated by reference into the present disclosure as if fully set forth herein: (i) Bo Li, Susu Xie, Gabriel Yik Keung, Jiangchuan Liu, Ion Stoica, Hui Zhang, Xinyan Zhang: An Empirical Study of the Coolstreaming+System. IEEE Journal on Selected Areas in Communications 25(9): 1627-1639 (2007) (hereinafter "REF1"); (ii) Ying Li, Zhu Li, Mung Chiang, A. Robert Calderbank: Video transmission scheduling for peer-to-peer live streaming systems. ICME 2008: 653-656 (hereinafter "REF2"); (iii) ISO/IEC 23008-1, 2014, "Information technology—High efficiency coding and media delivery in heterogeneous environments—Part 1: MPEG media transport (MMT)" (hereinafter "REF3"); (iv) ISO/IEC JTC1/SC29/WG11/MPEG2014/m33237, Z. Li, I. Bouazizi, and K. Park, MMT Amd1: Multiple QoE Operating Points Signalling in MMT ADC (hereinafter "REF4"); (v) ISO/IEC JTC1/SC29/WG11/MPEG2014/m33239, Z. Li, and I. Bouazizi, F F: Temporal Quality Signalling in ISO Based Media File Format (hereinafter "REF5"); and (vi) ISO/IEC JTC1/SC29/WG11/MPEG2013/N13992, Y. Reznik, A. Giladi, O. Oyman, D. Singer, and S. Zhang, "WD of ISO/IEC XXXXX-Y: Carriage of quality-related information in the ISO Based Media File Format" (hereinafter "REF6"). REF1 describes a Coolstream system deployed to carry live broadcasting of popular programs (such as the World Cup soccer and the Chinese new year gala) to a large number of users. REF2 describes streaming time scheduling intervals. REF3 describes a Moving Picture Experts Group (MPEG) Media Transport (MMT) system.

Figure 1:
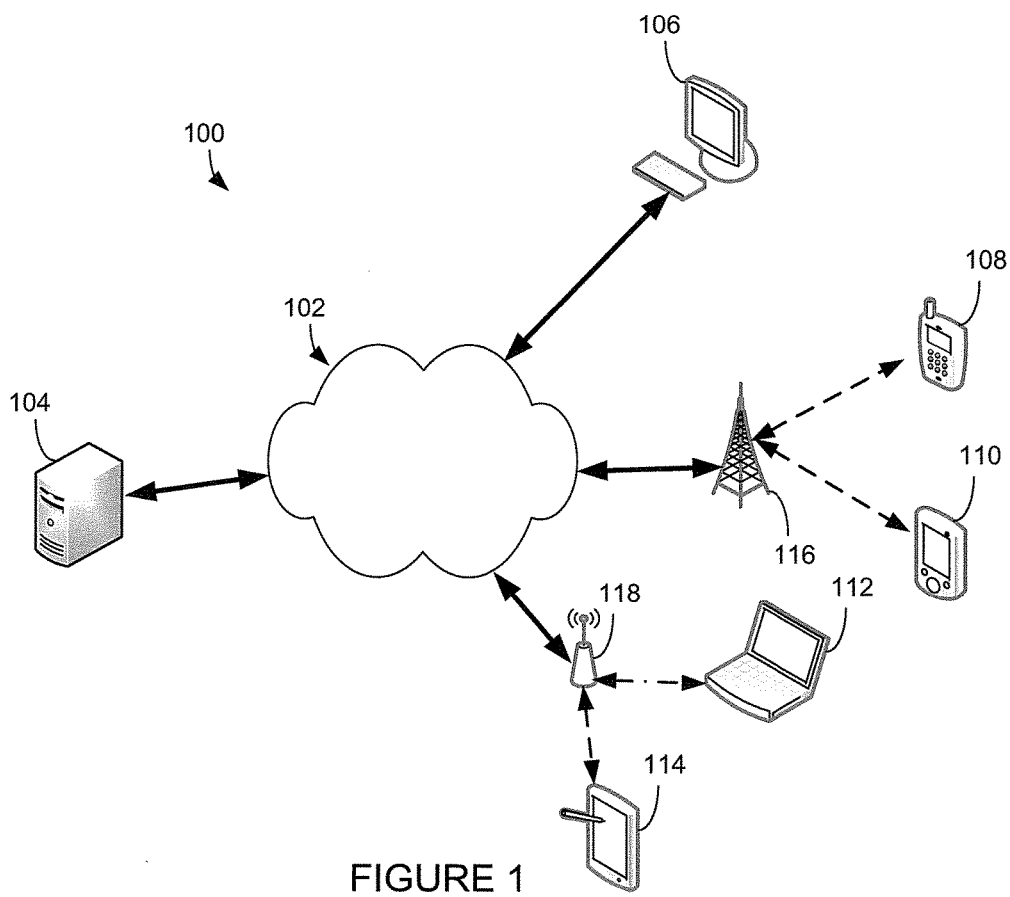
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANS), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices (for example, a television) could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, a compact cache manifest scheme supports retrieving and streaming of cache content in an on-demand and distributed manner.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
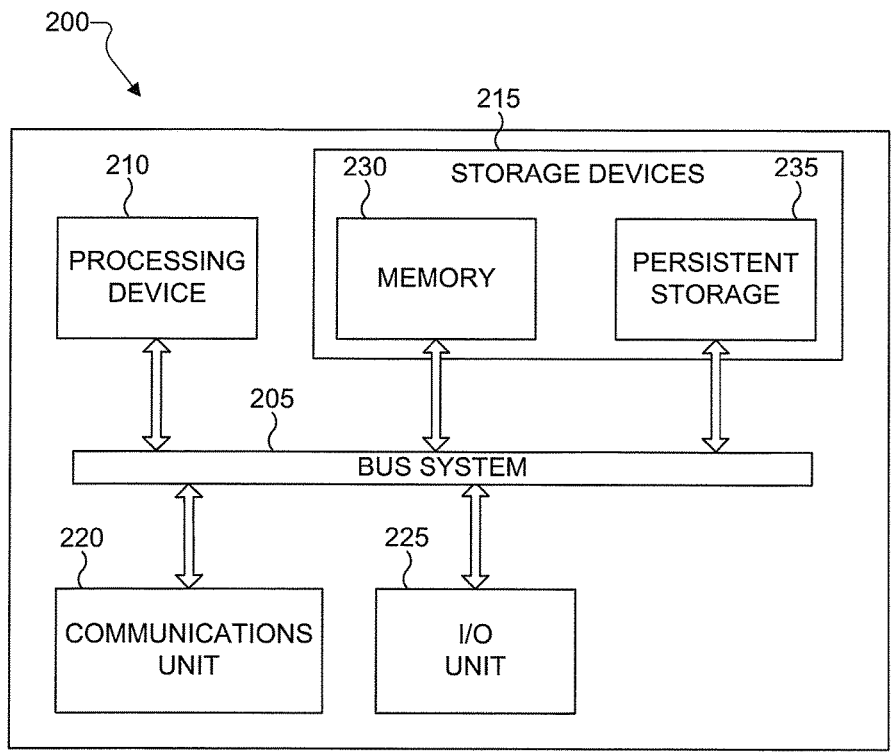
FIGS. 2 and 3 illustrate example devices in a computing system according to this disclosure.
Figure 3:
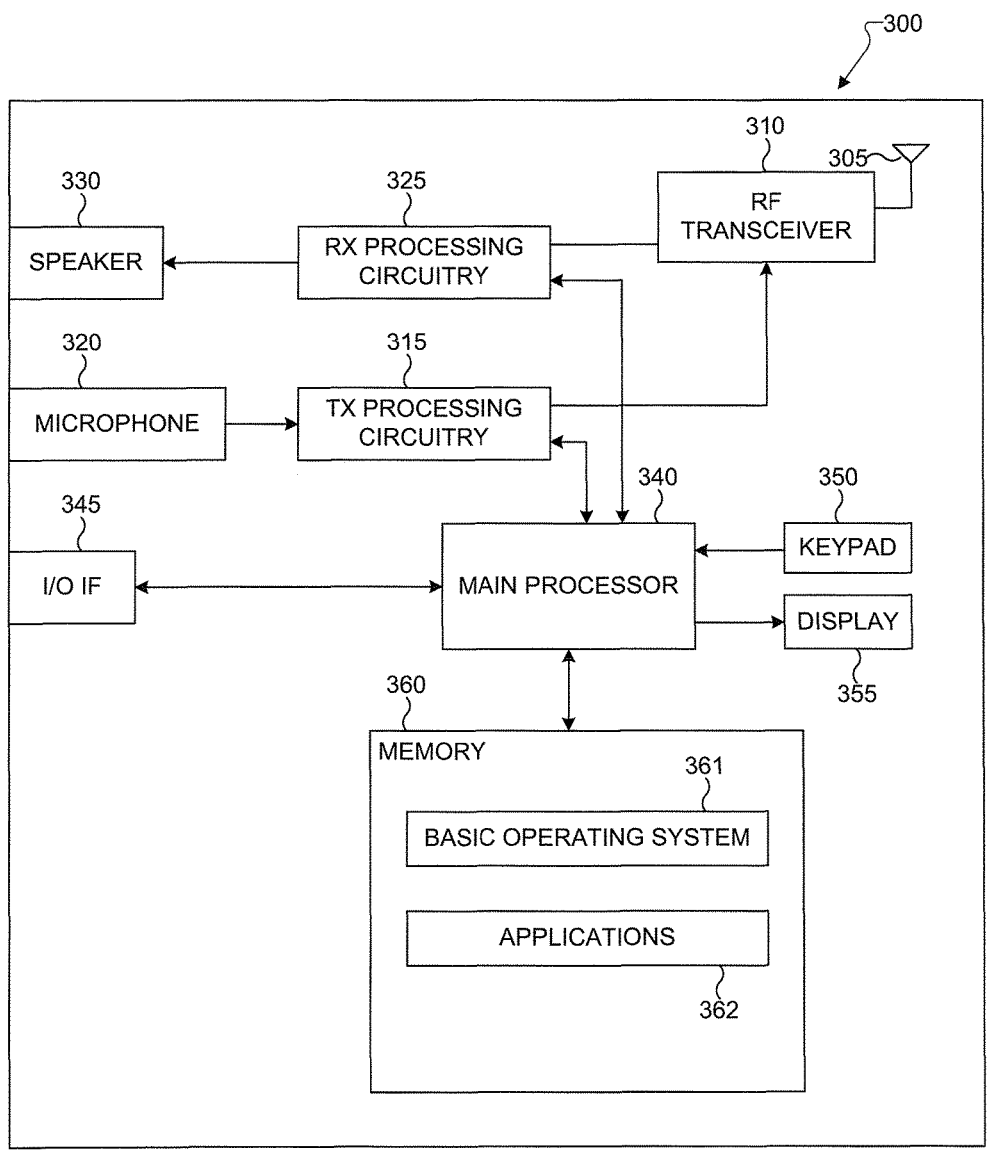

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the client device 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for a compact cache manifest scheme that supports retrieving and streaming of cache content in an on-demand and distributed manner. The main processor 340 can move data into or out of the memory 360 as required by an executing process. In some embodiments, the main processor 340 is configured to execute the applications 362 based on the OS program 361 or in response to signals received from external devices or an operator. The main processor 340 is also coupled to the I/O interface 345, which provides the client device 300 with the ability to connect to other devices such as laptop computers and handheld computers. The I/O interface 345 is the communication path between these accessories and the main controller 340.

The main processor 340 is also coupled to the keypad 350 and the display unit 355. The operator of the client device 300 can use the keypad 350 to enter data into the client device 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

As described in more detail below, a compact cache manifest scheme supports retrieving and streaming of cache content in an on-demand and distributed manner.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

One solution to accelerate video content delivery is a brute force approach of increasing end-to-end link capacity. Additionally, utilizing in-network cache to support peer-assisted multipath streaming is an effective video content delivery acceleration solution. The compact cache manifest scheme of this disclosure can be implemented in an in-network cache. The compact cache manifest scheme can be implemented into standards, such as MPEG MMT, MPEG Desktop and mobile Architecture for System Hardware (DASH), and Internet Engineering Task Force Application Layer Traffic Optimization (IETF ALTO).

The present disclosure describes embodiments of a MMT cache manifest scheme to support cache management and cache assisted delivery acceleration. The MMT cache manifest scheme can organize fragmented content in cache, and can signal different Quality of Service (QoS) and Quality of Experience (QoE) options available. The manifest is very compact, and can be easily retrieved from content requesting clients (such as client device 300). A very compact manifest avoids the costly broadcasting of the cache content list. Also, a very compact manifest allows easier alignment with a streaming time scheduling interval, which is usually much smaller than the cache manifest update time scale.

According to embodiments of the present disclosure, an MMT Cache Manifest indicates the content (also referred to as an "asset" "multimedia asset" or "MMT asset") available and different representations of the content and sub-representations of the content with resulting quality and QoS parameters. In certain embodiments, the manifest is in binary format and very compact, and can be the central piece of information for enabling cache assisted delivery acceleration.

Figure 4:
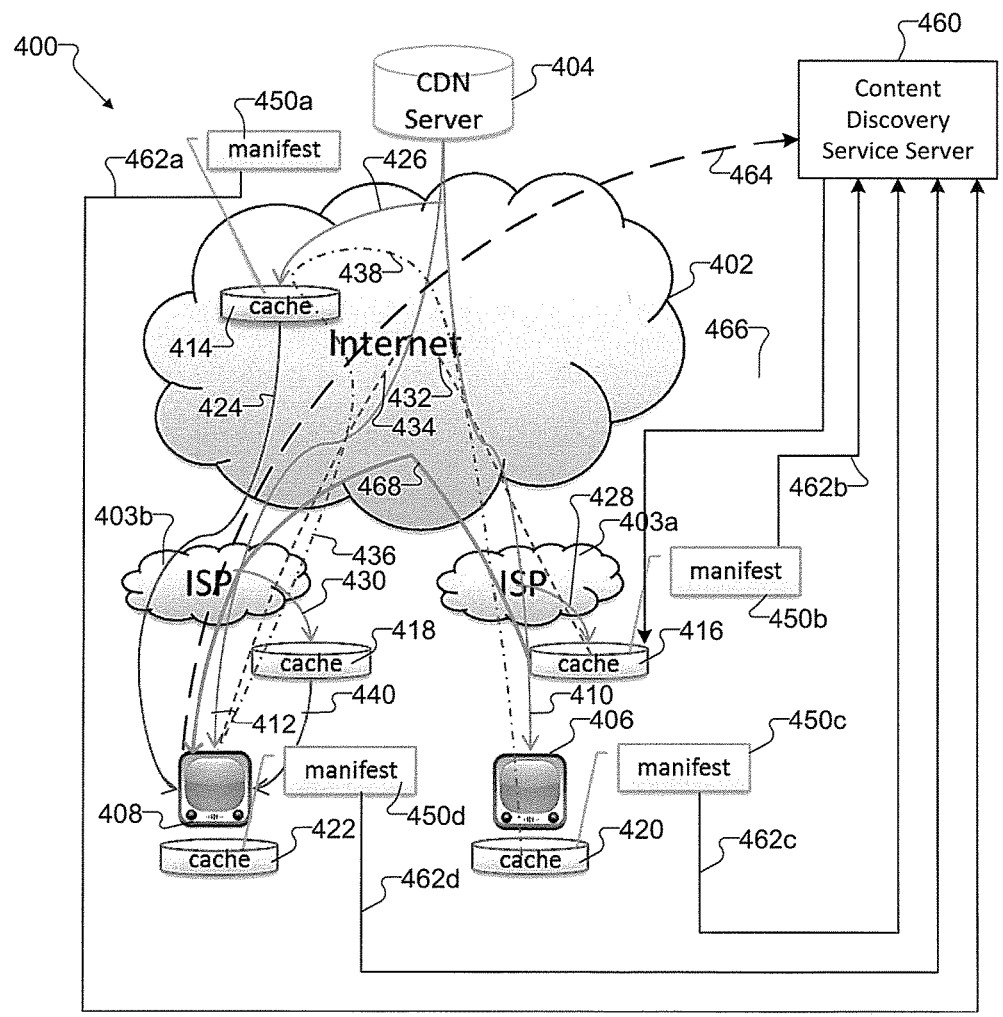
FIG. 4 illustrates a system including a network of data paths for cache video delivery by broadcasting over the Internet according to embodiments of the present disclosure.

FIG. 4 illustrates a system 400 including a network 402 of data paths for cache video delivery by broadcasting over the Internet according to embodiments of the present disclosure. The embodiment of the system 400 as shown in FIG. 4 is for illustration only. Other embodiments could be used without departing from the scope of the present disclosure.

The system 400 could, for example, be used with the system 400 of FIG. 1. Note that components 402, 404, 406, and 408 in FIG. 4 could be the same as or similar to corresponding components 102, 104, 106, and 108 in FIG. 1. These components in FIG. 4 can operate in the same or similar manner as the corresponding components in FIG. 1.

In addition to the network 402, the system 400 includes Internet Service Provider (ISP) sub-networks 403a-403b, a content delivery network (CDN) server 404, and client devices 406, 408. The CDN server 404 is the source of a video content and the server can directly serve the client device 406 of an end user through the network 402 using a direct data path 410. In a similar manner, the CDN server 404 uses another data path 412 to directly serve another client device 408. The direct data paths 410, 412 respectively run from the CDN server 404 through the network 402 and through a respective ISP sub-network 403a, 403b to the client device 406, 408. In certain embodiments, the CDN 404 includes 16 megabits per second (mbps) of out-going bandwidth.

The CDN server 402 cannot feasibly serve every client device directly for the several reasons including: limited computing power, out-going bandwidth, and end-to-end uncertainty. More particularly, the CDN server 404 computing power is limited, and can only support a limited number of concurrent connections. Further, the original CDN server 404 would need to have n×B out-going bandwidth, to support n users consuming video at bit rate B. For high bandwidth applications such as UHD (for example, B=16 mbps), the amount of needed bandwidth to serve one thousand (1000) users will require 16 gigabits per second (Gbps) or 16G of out-going bandwidth. In the case of UHD, the amount of needed bandwidth can easily exceed and use up the amount of existing bandwidth belonging to the CDN server 404 (for example, B=16 mbps). In this example, the CDN server 404 only has enough bandwidth to support a single user executing an UHD application. Also, once the packet is transmitted from the originating CDN server 404, the current state of the Internet network 402 cannot guarantee throughput nor delay. This lack of a guarantee is the uncertainty that may remain as a feature of Internet networks for a long time.

The system 400 includes one or multiple top-level caches 414 at various places in the network 402. The system 400 also includes a lower-level cache 416, 418 associated with each ISP sub-network 403a, 403b. Each client device 406, 408 includes a cache 420, 422. Instead of serving the end user client devices 406, 408 from the originating CDN server 404, the top-level cache hosts 414 can directly serve a client device 406 through a data path 424. A top level cache 414 can serve client devices with usually much shorter RTT, compared with the RTT of the CDN server 404. Also, the alternative delivery path 424 may have less congestion than the data path 412 from the CDN server 404.

The CDN server 404 can directly provide content to the top-level cache 414 through a data path 426. The CDN server 404 can directly provide content to the lower-level cache 416 through a data path 428, which runs through the network 402 and the ISP sub-network 403a. Similarly, the CDN server 404 directly serves the lower-level cache 418 through a data path 430. Additionally, the CDN server 404 can provide content to the lower-level cache 416 through an alternative data path 432 and to the client device 408 through an alternative data path 434 (the alternative data paths shown as a dashed lines).

The top-level cache 414 can provide content to the client device 408 through an alternative data path 436 (shown as a dashed path) and to the cache 420 of the client device 406 through an alternative data path 438 (shown as a dashed path).

The lower-level cache 418 can use a direct data path 440 to serve content to the client devices 408 associated with a same ISP network 403b.

The present disclosure provides methods (further described in reference to FIG. 7) for managing the various caches 414, 416, 418, 420, 422 and utilizing the data paths to accelerate content delivery, avoid congestion, and avoid playback freeze. More particularly, each cache 414, 416, 418, 420, 422 includes a manifest 450a-d that enables the cache to implement a compact cache manifest scheme. The manifest 450a-d is described in further detail in reference to FIGS. 6A and 6B below.

In certain embodiments, the system 400 includes a content discover service server 460 (CDSS) which could be the same as or similar to the server 104 in FIG. 1. The CDSS 460 implements methods for managing the various caches 414, 416, 418, 420, 422. For example, each cache 414, 416, 418, 420, 422 generates a manifest 450a-d and transmits as an update message 462a-d, to the CDSS 460. The update message 462a-d provides the manifest 450a-c and a validity timestamp to the CDSS 460, enabling the CDSS 460 to manage the various caches 414, 416, 418, 420, 422 from centralized node in the communication network 402.

For example, the client device 408 generates the update message 462d that includes the manifest 450d (e.g., a copy of the manifest 450d) based on the contents the playback buffer 422 within the client device 408. In response to receiving the update message 462d, the CDSS 460 stores the manifest 450d for reference purposes; links the manifest 450d with the address of the client device 408; and determines when the manifest 450d is valid by using the validity timestamp within the update message 462d. When the client device 408 sends a subsequent update message 462d, upon receipt the CDSS 460 stores the updated manifest 450d (or changes to the manifest) and links the subsequent validity timestamp to the updates (e.g., changes, or no changes) within the manifest 450d. The client device 408 can send an update message 462 anytime the content stored within the playback buffer changes 422 or periodically (e.g., after an interval). Each cache 414, 416, 420, 422 in the network 402 that has a cache manifest can send an update message 462a-d to the CDSS 460 using a similar process as the playback buffer 422 of the client device 408. That is, the CDSS 460 maintains multiple updated cache manifests for multiple caches that are within the system 400 and coupled to the network 402.

As another example of managing the various caches 414, 416, 418, 420, 422 from centralized node in the communication network 402, the CDSS 460 can intercept content request messages from data paths directed to the original content CDS server 404. Also, the CDSS 460 can receive a content request message 464 from the client device 408 directed to the CDSS 460. In response to receiving the content request message 464, the CDSS 460 determines whether or not to serve the requested content to the client device 408. That is, the CDSS 460 references the multiple cache manifests stored within the CDSS 460 searching for information to comply with the information within the content request message 464. The CDSS 460 determines to not serve the requested content when none of the cache manifests stored within the CDSS 460 comply with the content request message 464. The CDSS 460 selects one cache from the various caches in the network 402 to serve the requested content. The CDSS 460 determines to serve the requested content when the CDSS 460 finds a valid cache manifest 450b that complies with the content request message 464. By finding the compliant cache manifest 450b, the CDSS 460 also finds the linked address of the cache 416 from which the compliant cache manifest 450d was received. The CDSS 460 selects the cache 416 linked to the compliant cache manifest 450d as the cache from which to serve the requested content to the client device 408. In response to the determination to serve the requested content, CDSS 460 transmits an instruction 466 to the selected cache 416 to transmit the requested content to a client device 408 that generated the request message 464. The instruction 466 can include an identification (for example, an address) of the selected cache 416 and a destination address or identification of the client device 408 to which the requested content will be sent. In response to receiving the instruction 466, the cache 416 transmits the requested content 468 to the client device 408 through the networks 402 and 403b.

The CDSS 460 can implement various processes to determine to serve the requested content to the client device 408. For example, the CDSS 460 determines to serve the requested content by the following processes: matching an asset identifier (ID) in the plurality of cache manifests to an asset ID included in the request message 464; matching a segment identifier (e.g., fingerprint or timestamp of the segment) in the plurality of cache manifests to a segment identifier included in the request message 464; or determining that a Quality of Service (QoS) parameter of a rate-distortion operating point (RDOp) in the multiple cache manifests equals or exceeds a bitrate included in the request message 464.

Figure 5:
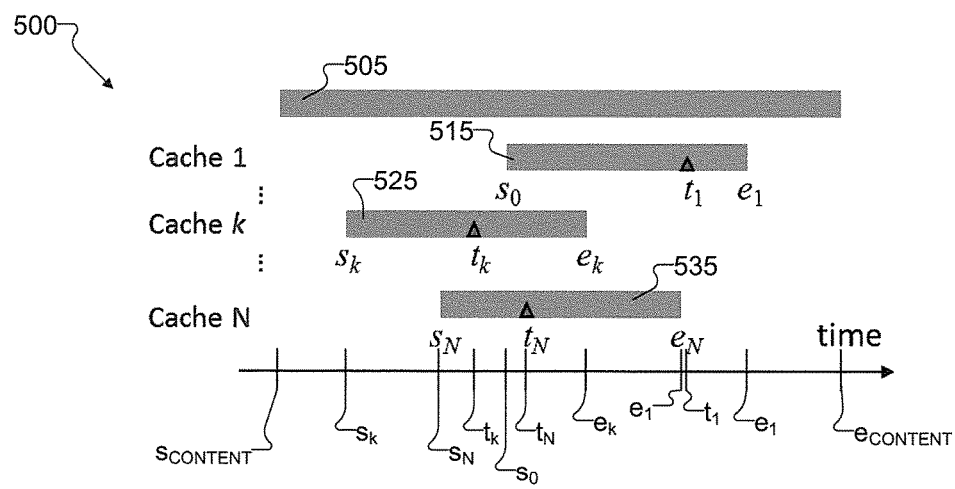
FIG. 5 illustrates an timeline of cache status according to embodiments of the present disclosure.

FIG. 5 illustrates a timeline of cache status according to embodiments of the present disclosure. In this example timeline 500, no fragmentation of content is present. The timeline of cache status 500 shown in FIG. 5 is for illustration only. Other embodiments of timelines could be used without departing from the scope of the present disclosure.

Content at the originating CDN server 404 becomes available becomes available linearly over time in a predictable manner. That is, in response to receiving a request for content, the CDN server 404 can transmit the requested content to the requesting client device in a linear manner. By comparison, content availability is not predictable at caches 414, 416, 418, 420, 422. Different caches to contain different segments of content and with different sub-representations (in DASH terminology) with different quality and QoS requirements because of user behavior and different start times of streaming. That is, the client devices 408 connected to the sub-network 403b may use a higher QoS requirement than the QoS requirement of the client 406 to request the same content that the client 406 requests, and as a result, the cache 418 closest to the client 408 may store the requested content at the higher QoS than the QoS of the requested content stored in the cache 416 closest to the client 406. Similarly, at any one time, a cache 416 that has served a particular content to multiple client devices may store multiple segments of the particular content, but the cache 418 has not received a request for that particular content may not include any segments of the particular content.

To facilitate cache assisted streaming, the content current playback timestamp $(t_k)$ and content start and end timestamps $\{s_k, e_k\}$ need to be signaled. For the same segment, when different sub-representations are available, the following information needs to be signaled regarding each sub-representation: the associated MFU index, the resulting quality, and the QoS information. The signaling of sub-representation information can be signaled in a manner similar to the signaling described in REF4 regarding the multiple operating points ADC case in streaming.

For the example timeline 500 shown, the network (such as network 400) includes a CDN server (such as server 404) that stores a video content 505 in its entirety in a non-fragmented manner. The content 505 has a start timestamp of $s_{CONTENT}$ and an end timestamp of $e_{CONTENT}$. The network also includes N caches (Cache 1 . . . Cache k . . . Cache N), and each cache stores a segment representing different portions of the content 505. For example, the first cache stores a segment 515 of the content having the set of timestamps $\{s_0, t_1, e_1\}$. In a similar manner, the $k^{th}$ cache stores a segment 525 having the timestamps $\{s_k, t_k, e_k\}$, and the $N^{th}$ cache stores the segment 535 having the timestamps $\{s_N, t_N, e_N\}$. In this example, the collection of segments 515, 525, 535 (Cache 1 through Cache N) do not provide any gaps in time or punches of missing content and thereby do not fragment the content 505 between timestamps $\{s_k, e_1\}$. In this example, none of the caches stores a segment representing the portion of the content 505 between timestamps $\{s_{CONTENT}, s_k\}$ or between timestamps $\{e_1, e_{CONTENT}\}$.

Figure 6B:
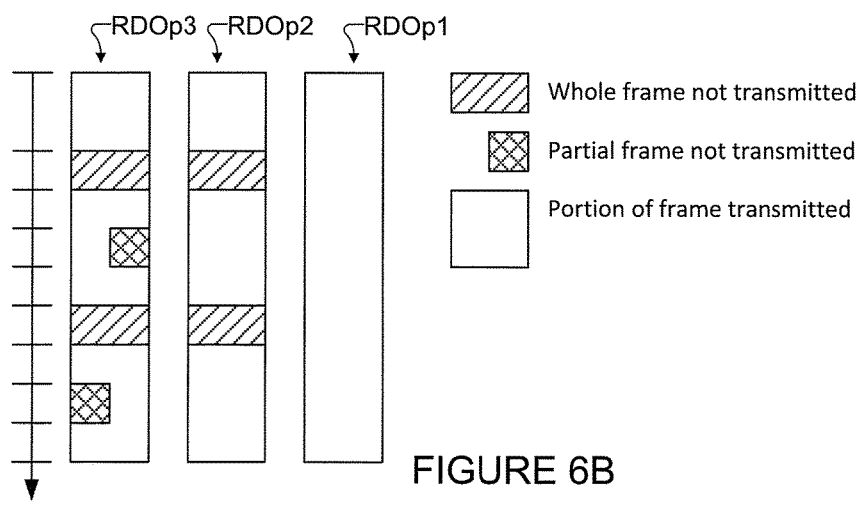
FIG. 6B illustrates example versions of a segment in the cache manifest of FIG. 6A corresponding to the various RDOps for the segment.
Figure 6A:
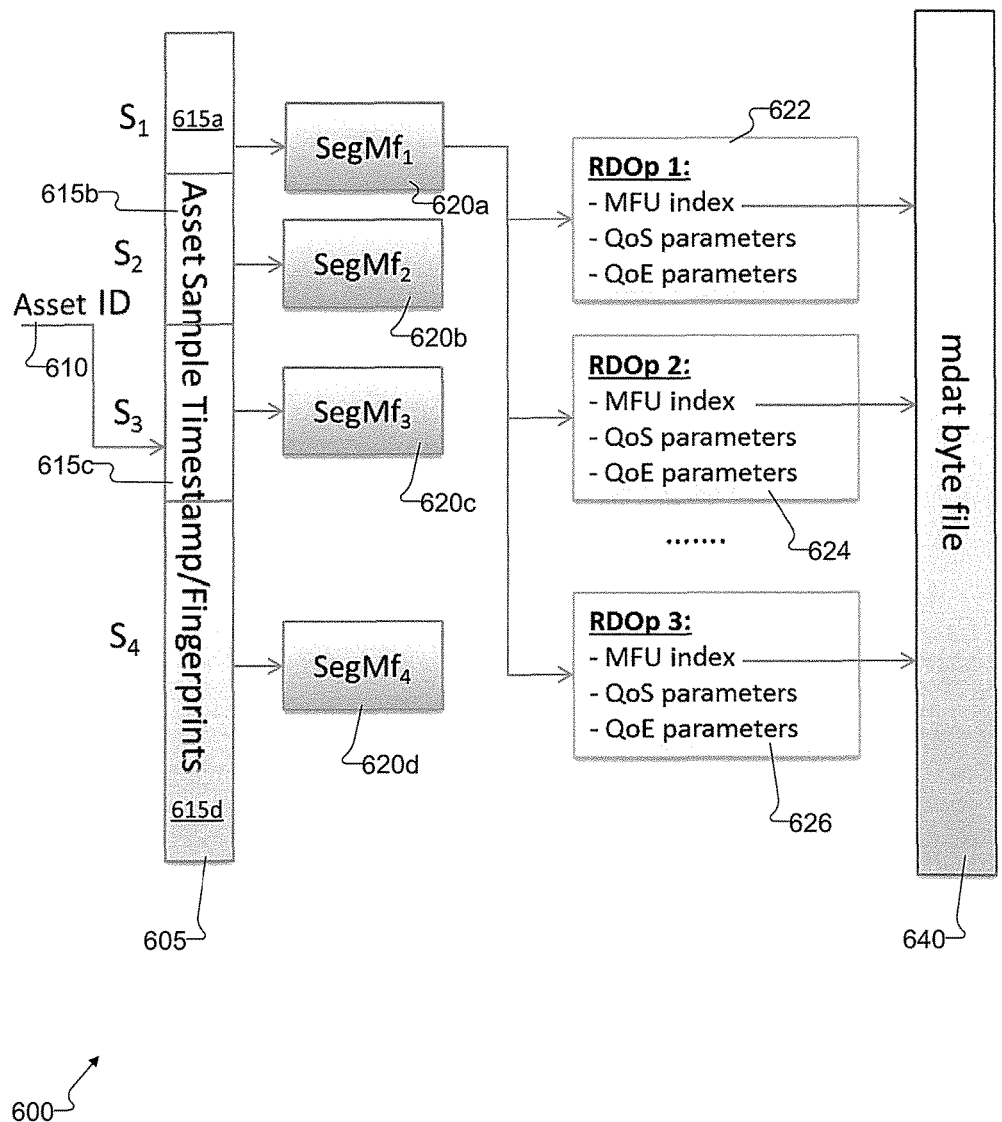
FIG. 6A illustrates an MMT cache manifest according to embodiments of the present disclosure.

FIG. 6A illustrates an MMT cache manifest 600 according to embodiments of the present disclosure. The embodiment of the MMT cache manifest 600 shown in FIG. 6A is for illustration only. Other embodiments could be used without departing from the scope of the present disclosure.

Note, the MMT cache manifest 600 shown in FIG. 6A could be the same as or similar to the corresponding manifests 450a-d in FIG. 4. These components in FIG. 6A can operate in the same or similar manner as the corresponding components in FIG. 4.

As an example for simplicity, this disclosure describes the manifest 600 as belonging to the cache 418, however, each cache in a compact cache manifest scheme can include a manifest. The MMT cache manifest 600 is organized by asset identifiers (Asset ID). That is, each asset 605 (for example, content 505) is identified by an asset ID 610. The asset ID 610 can be a uniform resource locator (URL), which identifies a location of the entire, non-segmented content 605.

The asset 605 includes a series of segments 615a-d ($S_1$, $S_2$, $S_3$, and $S_4$). For each asset 605, the corresponding segments 615a-d that are present in the cache 418 is listed by timestamp. A timestamp (shown by a horizontal dividing line) delineates a boundary separating the first segment 615a ($S_1$) from the second segment 615b ($S_2$). In general, the timestamps separate consecutive segments. For example, the asset 605 can include 100 frames of video content, wherein the segment 615a ($S_1$) includes frames 1 through 20, the segment 615b ($S_2$) includes frames 25-35, the segment 615c ($S_3$) includes frames 50-55, and the segment 615d ($S_4$) includes segments 75-95. In certain embodiments, a timestamp identifies the segment. In certain embodiments, a fingerprint identifies the segment.

For each segment 615a-d, the manifest 600 includes a corresponding segment manifest (SegMf) 620a-d data structure. Each segment manifest 620a data structure includes one or more multiple rate-distortion operating points (RDOp). The number of RDOps indicates the number of versions of the segment the cache can provide. More particularly, the segment manifest 620a data structure includes multiple RDOps 622, 624, 626 (RDOp1, RDOp2, and RDOp3). The segment manifest 620a indicates that the cache 418 stores three different versions of the segment 615a: a first version corresponding to the RDOp 622, a second version corresponding to RDOp 624, and a third version corresponding to RDOp 626. The three versions of the segment 615a is described more particularly with reference to FIG. 6B.

Each RDOp 622, 624, 626 includes a media data unit (MDU) (for example, a media fragmentation unit (MFU) index), QoS parameters associated with the segment 615a ($S_1$), and QoE parameters associated with the segment 615a ($S_1$). That is, the MDU index, QoS parameters, and QoE parameters collectively represent each RDOp. The MDU index references a location of the segment 615a in the content file 640 (for example, a flat machine data (mdat) byte file) (this reference relationship is shown by an arrow pointing from the index to an address location in the mdat byte file). The cache 418 internally generates each MDU index for the content file 640. More particularly, the cache 418 generates the MDU index 630 for the RDOp1 representation of the first segment 615a ($S_1$), generates the MDU index 632 for the RDOp2, and generates the MDU index 634 for the RDOp3. The associated QoS parameters indicate average bit rate and peak bit rate the segment 615a ($S_1$) can be transmitted from the cache 418. The QoE parameters indicate the spatio-temporal quality of the segment conforming to the International Organization for Standardization (ISO) base media file format (ISOBMFF) quality metrics described in REF4. The QoE indicates an amount of distortion within the segment 615a when using corresponding RDOp. The cache 418 can transmit signals indicating the QoE parameter information in a manner similar to the signaling described in REF4. The cache 418 transmits an application programming interface (API) to retrieve associated MFUs from the cache host.

FIG. 6B illustrates example versions of a segment 615a ($S_1$) in the cache manifest of FIG. 6A corresponding to the various RDOps for the segment 615a. The example versions of the segment 615a shown in FIG. 6B are for illustration only. Other embodiments could be used without departing from the scope of the present disclosure.

As an example, the segment 615a spans ten seconds of timestamps {$s_1$=0, $e_1$=10} and includes frames 1-20. The RDOp 1 622 includes a MDU that references a location in the content file 640 where the portions of the content to be transferred to the client device is stored. The RDOp 1 622 corresponds to a file size of 1 megabytes (MB). The QoS parameters indicate a high quality bitrate of 1.0 megabytes per second (MBps). The QoE parameters (e.g., 1.0) indicate no distortion, namely, that all of the frames of the segment are transmitted and that no portion of any of the frames are removed or otherwise dropped from content served to the client device.

The RDOp2 624 corresponds to a file size of 800 kilobytes (KB). The QoS parameters indicate a lower quality bitrate of 800 kilobytes per second (0.8 MBps). The QoE parameters (e.g., 0.8) indicate low distortion, namely, that a large portion of the frames of the segment are transmitted and that a small portion of certain frames are removed or otherwise dropped from content served to the client device. The removed portion of a frame can be the whole frame (shown by unidirectional diagonal hatching) or a less than the whole frame (shown by bidirectional diagonal hatching). As shown in this example, the removed portions of the segment 615a represent 200 KB of data that is not transmitted when RDOp2 is used, but by comparison are transmitted when RDOp1 is used.

The RDOp3 626 corresponds to a file size of 640 kilobytes (KB). The QoS parameters indicate a further reduced quality bitrate of 600 kilobytes per second (KBps). The QoE parameters indicate a lower distortion, namely, that a large portion of the frames of the segment are transmitted and that a small portion of certain frames are removed or otherwise dropped from content served to the client device. The removed portion of a frame can be the whole frame (shown by unidirectional diagonal hatching) or a less than the whole frame (shown by bidirectional diagonal hatching). As shown in this example, the removed portions of the segment 615a represent 360 KB of data that is not transmitted when RDOp3 is used, but by comparison are transmitted when RDOp1 is used.

Cache manifest enables fragmented content identification. For example, a requested content can include video content for $t_0$-$t_{10}$ that is not stored together in any one cache, but various fragments of the requested content are in different caches such that a combination of the fragments is equivalent to the whole requested content. The cache includes and the manifest indicates multiple representation of the cache content for different QoS and QoE tradeoffs.

Table 1 provides an example of MMT cache manifest syntax. Table 2 provides semantics for the terms used in the MMT cache manifest syntax.

TABLE 1

MMT cache manifest syntax

| Syntax | Value | n_bits | Mnemonic |
|---|---|---|---|
| MMT_Cache_Manifest ( ) { | | | |
|   cache_id | | 32 | uimsbf |
|   manifest_time_stamp | | 32 | uimsbf |
|   n_assets | N1 | 32 | uimsbf |
|   cache_assets_descriptors { | | | |
|     asset_id | | 32 | uimsbf |
|     for (i=0; i<N1; i++) { | N2 | 32 | uimsbf |
|       n_segments | | | |
|       for (j=0;j<N2;j++) { | | 32 | uimsbf |
|         segment_start | | 32 | uimsbf |
|         segment_end | | 8 | uimsbf |
|         n_rdop | N3 | | |
|         for (k=0;k<N3; k++) { | | | |
|           spatial_quality | | 16 | uimsbf |
|           temp_quality | | 16 | uimsbf |
|           rate | | 32 | uimsbf |
|           max_rate | | 32 | uimsbf |
|         } | | | |
|       } | | | |
|     } | | | |
|   } | | | |
| } | | | |

TABLE 2

Semantics

| Term | Description |
|---|---|
| cache_id | indicates the identifier of the cache, can be a hash from IP address and port number |
| manifest_time_stamp | the latest time stamp of the manifest update. |
| n_asset | the number of assets in cache. |
| asset_id | the identifier or identification of assets in cache. |
| n_segment | the number of segment in the current asset. |
| segment_start | the starting time stamp of the segment within the asset. |
| segment_end | the end time stamp of the segment within the asset. |
| spatial_quality | spatial quality such as PSNR for the segment and operating point, as defined in ISOBMFF carriage of quality info [6]. |
| temp_quality | temporal layer quality such as FSIG induced distortion, for the segment and operating point, as defined in ISOBMFF carriage of quality info [6]. |

Figure 7:
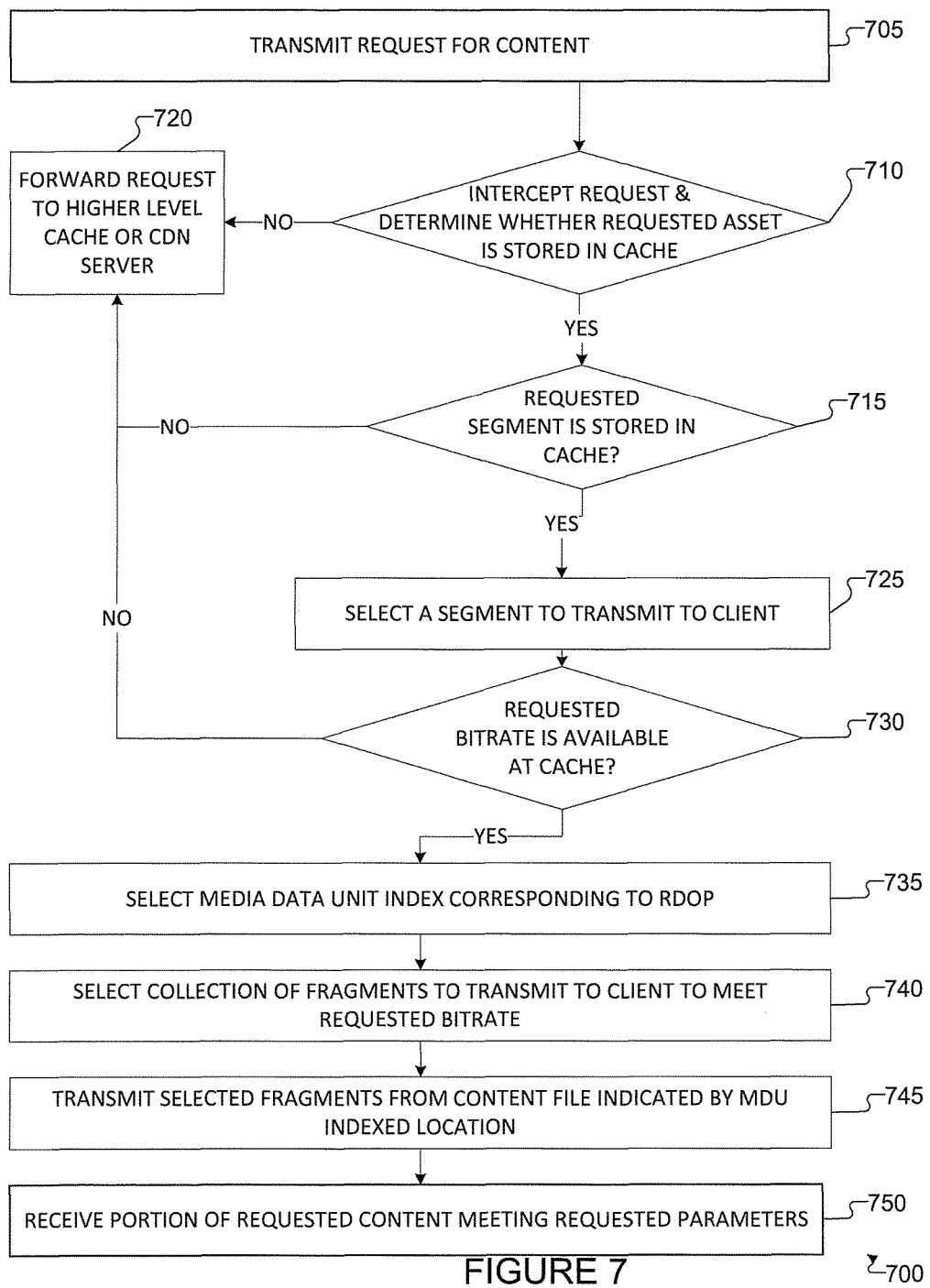
FIG. 7 illustrates a method of implementing a MMT cache manifest scheme according to embodiments of the present disclosure.

FIG. 7 illustrates a method of implementing a MMT cache manifest scheme according to embodiments of the present disclosure. The method 700 enables a network cache 418, as a closer more reliable alternative source of requested content than an originating content server 404, to provide high quality video content to a requesting client. The method 700 is implemented by the system 400. The embodiment of the method 700 shown in FIG. 7 is for illustration only. Other embodiments could be used without departing from the scope of the present disclosure.

In block 705, an end user client device requests a specific content by transmitting a content request message including the asset ID of the requested content, the bitrate acceptable to the client device, and the segment of the requested content. In certain embodiments, the content request message includes the asset ID and a set of timestamps {s,e} indicating a requested segment. In certain embodiments, the content request message includes the asset ID and a fingerprint indicating a requested segment. The content request message can include an intended destination address of the CDN server 404.

In block 710, a cache in the network 402 intercepts the content request message. The cache determines the requested asset, the requested segment, and the requested bitrate from the content request message. The cache can be a cache along the data path between the client device and the CDN server 404, for example, the cache of an ISP sub-network 403a, b. The CDN server 404 stores the requested content and can deliver the requested content to the client device with the uncertainty and limited bandwidth described above. Also, a cache 414, 416, 418 distributed throughout the system 400 networks 402, 403a-b storing the requested content may be able to deliver the requested content with increased certainty and higher bandwidth compared to the CDN server. Also in bock 710, the cache determines whether the requested asset is stored in the cache. For example, the cache compares the asset ID of the requested asset to the list of asset IDs in the manifest 600. If the asset ID of the requested asset is present in the manifest of the cache, the process proceeds to block 715. If the asset ID of the requested asset is not present in the manifest of the cache, the method 700 proceeds to block 720.

In block 715, the cache determines whether the requested segment of the requested asset is stored in the cache, for example by comparing the timestamps in the content request message to the timestamps in the manifest of the cache. In certain embodiments, the cache determines whether the requested segment of the requested asset is stored in the cache by comparing the fingerprints in the content request message to the fingerprints in the manifest. If the requested timestamp or requested fingerprint is present in the segments 620a-d (for example, list of segments) in the cache, the method 700 proceeds to block 725, else, the method proceeds to block 720.

In block 720, the cache forwards the content request message to a higher level device in the network 402. For example, a lower level cache 416, 418 can forward the content request message to a top-level cache 414, which can forward the content request message to the higher level CDN server 404 that transmits the requested segment to the requesting client device. The top level cache performs the method 700 (beginning at the process clock 705) and, if necessary, the CDN server 404 serves the requested content to the client device.

In block 725, the cache selects a segment to transmit to the client device. For example, the cache selects the segment 615a-d ($S_1$, $S_2$, $S_3$, and $S_4$) from the manifest that matches the timestamp or fingerprint in the content request message. For example, if the content request message includes a timestamp of {5-7}, then cache will select to transmit the segment 615a (S1), which spans ten seconds of timestamps {$s_1$=0, $e_1$=10} including the requested portion {5-7}.

In block 730, the cache determines whether the requested bitrate in the content request message matches any of the bitrates in the manifest. That is, the cache determines whether the requested segment is stored in the cache in a sufficiently fragmented manner to enable the cache to transmit the requested segment to the client device at a rate that is at least the requested bitrate. More particularly, the cache compares the requested bitrate in the QoS of the content request message to the QoS of each of the various RDOps in the manifest. If at least one of the RDOps in the manifest meet the bitrate requirements in the content request message, then the method 700 proceeds to block 735, else, the method 700 proceeds to block 720.

In block 735, the cache selects the RDOp that most closely matches, and that also provides at least the bitrate of the requested QoS. By selecting one of the RDOps, the cache 418 selects which version of the segment 615a to provide to the requesting client device based on the content of the request and the best matched RDOp (i.e., including parameters closest to the contents of the request). As an example, the RDOp 1 provides the highest quality version of the requested segment (e.g., $S_1$ 615a) and requires the largest bandwidth (on par with the bandwidth requirements of the CDN server 402), the RDOp2 provides a mid-range quality version of the requested segment and requires less bandwidth than the CDN server 402, and the RDOp3 provides a lower-range quality version of the requested segment and requires further reduced bandwidth than the RDOp2.

In block 740, the cache selects a collection of fragments to transmit to the client device to meet the bitrate in the content request message. That is, the media data unit (MDU) of each RDOp corresponds to frames and portions of frames that will be transmitted or dropped from transmission based on the bitrate of the RDOp. In response to selecting the RDOp in block 735, the cache selects the fragments corresponding to the MDU of the selected RDOp. For example, by selecting RDOp3 for segment SI 615a, the cache does not transmit the whole frame and partial frames indicated by the hatched portions of the segment SI 615a in FIG. 6B.

In block 745, the cache transmits (to the client device) the fragments of the requested segment that correspond to the MDOp selected in block 735.

In block 750, in response to transmitting the content request message, the requesting client device receives, from a cache of the system 400 implementing a compact cache manifest scheme, a requested segment of a requested asset at least the requested bitrate.

In certain embodiments, in response to transmitting the content request message, the client device concurrently receives a plurality of manifests from the caches in the network 402, 403a-b. The client device can determine which caches can best serve the requested content to the client device. For example, each cache in the system 400 can concurrently update a table in the CDN server 404, and in response to receiving the content request message from the client device, the CDN server 404 can concurrently transmit the plurality of manifests (each representing the content of the various caches in the system 400) to the client device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for delivering content in a communication network, the method including:
  receiving a request message requesting content to be served;
  determining if the requested content can be served from a current cache based on information in one or more cache manifest descriptions;
  selecting a portion of the requested content, based on the information in the one or more cache manifest descriptions, that meets a requested bitrate in the request message; and
  selecting a rate-distortion operating point (RDOp) wherein the RDOp includes one or more Quality of Experience (QoE) parameters indicating a distortion of the requested content, wherein the distortion of the requested content indicates whether one or more frames or partial frames are removed from the requested content,
  wherein the cache manifest descriptions include:
    a list of asset identifiers, each asset identifier (ID) identifying an asset of which at least one segment is stored in the current cache;
    a list of segment IDs for each asset ID, each segment ID identifying a segment of the asset identified by the asset ID;
    a list of RDOps for each segment ID, each RDOp including:
      a media data unit (MDU) index corresponding to fragments of segment content stored in a content file in the current cache, and
      a QoE parameter, and
  wherein determining if the requested content can be served from the current cache comprises determining that a Quality of Service (QoS) parameter of the RDOp in the one or more cache manifest descriptions equals or exceeds a bitrate included in the request message.

2. The method of claim 1, wherein determining if the requested content can be served from the current cache comprises matching an asset identifier (ID) in the one or more cache manifest descriptions to an asset identifier included in the request message.

3. The method of claim 1, wherein determining if the requested content can be served from the current cache comprises matching a segment identifier in the one or more cache manifest descriptions to a segment identifier included in the request message.

4. The method of claim 3, wherein the segment identifier included in the request message includes a timestamp of the requested content.

5. The method of claim 3, wherein the segment identifier included in the request message includes a fingerprint of the requested content.

6. The method of claim 1, wherein the RDOp further includes:
  the MDU index corresponding to fragments of the requested content stored in the content file in the current cache, and
  wherein the requested content includes the fragments.

7. The method of claim 1, wherein receiving the request message comprises intercepting, by a cache along a data path between a client device and a content delivery network (CDN) server, the request message.

8. An apparatus for use in a communication network, the apparatus comprising:
  processing circuitry configured to:
  receive a request message requesting content to be served;
  determine if the requested content can be served from a current cache based on information in one or more cache manifest descriptions;
  select a portion of the requested content, based on the information in the one or more cache manifest descriptions, that meets a requested bitrate in the request message; and
  select a rate-distortion operating point (RDOp), wherein the RDOp includes one or more Quality of Experience (QoE) parameters indicating a distortion of the requested content, wherein the distortion of the requested content indicates whether one or more frames or partial frames are removed from the requested content,
  wherein the cache manifest descriptions include:
    a list of asset identifiers, each asset identifier (ID) identifying an asset of which at least one segment is stored in the current cache;

a list of segment IDs for each asset ID, each segment ID identifying a segment of the asset identified by the asset ID;

a list of RDOps for each segment ID, each RDOp including:

a media data unit (MDU) index corresponding to fragments of segment content stored in a content file in the current cache, and a QoE parameter, and wherein determining if the requested content can be served from the current cache comprises determining that a Quality of Service (QoS) parameter of the RDOp in the one or more cache manifest descriptions equals or exceeds a bitrate included in the request message.

9. The apparatus of claim 8, wherein the processing circuitry is further configured to determine if the requested content can be served from the current cache by matching an asset identifier (ID) in the one or more cache manifest descriptions to an asset identifier included in the request message.

10. The apparatus of claim 8, wherein the processing circuitry is further configured to determine if the requested content can be served from the current cache by matching a segment identifier in the one or more cache manifest descriptions to a segment identifier included in the request message.

11. The apparatus of claim 10, wherein the segment identifier included in the request message includes a timestamp of the requested content.

12. The apparatus of claim 10, wherein the segment identifier included in the request message includes a fingerprint of the requested content.

13. The apparatus of claim 8, wherein the RDOp further includes:

the MDU index corresponding to fragments of the requested content stored in the content file in the current cache, and wherein the requested content includes the fragments.

14. The apparatus of claim 8, wherein the processing circuitry is further configured to receive the request message by intercepting the request message from a data path between a client device and a content delivery network (CDN) server.

* * * * *